United States Patent
Girardeau et al.

(10) Patent No.: US 9,839,069 B2
(45) Date of Patent: Dec. 5, 2017

(54) SYSTEM AND METHOD FOR MACHINE PARAMETER ANALYSIS IN WIRELESS FIELD UNITS

(71) Applicant: Uptime Solutions Inc., Jacksonville, FL (US)

(72) Inventors: James Girardeau, Austin, TX (US); Timothy L. Rohrer, Jacksonville, FL (US)

(73) Assignee: UPTIME SOLUTIONS, Jacksonville, FL (US)

( * ) Notice: Subject to any disclaimer, the term of this patent is extended or adjusted under 35 U.S.C. 154(b) by 439 days.

(21) Appl. No.: 14/558,634

(22) Filed: Dec. 2, 2014

(65) Prior Publication Data
US 2015/0366001 A1 Dec. 17, 2015

Related U.S. Application Data

(60) Provisional application No. 62/013,215, filed on Jun. 17, 2014.

(51) Int. Cl.
*G06F 19/00* (2011.01)
*H04W 84/18* (2009.01)
*H04W 4/00* (2009.01)

(52) U.S. Cl.
CPC ........... *H04W 84/18* (2013.01); *H04W 4/006* (2013.01)

(58) Field of Classification Search
CPC ..................................................... H04W 84/18
USPC ........................................................ 702/188
See application file for complete search history.

(56) References Cited

U.S. PATENT DOCUMENTS

| 5,907,491 | A   | * | 5/1999 | Canada   | G01H 1/003 340/3.1 |
| 2003/0023518 | A1 | * | 1/2003 | Spriggs  | G05B 15/02 705/28 |
| 2014/0281029 | A1 | * | 9/2014 | Danforth | H04L 67/327 709/243 |
| 2015/0264586 | A1 | * | 9/2015 | Girardeau | G01R 23/00 370/252 |

OTHER PUBLICATIONS

Jack Peters, "Beginning Vibration Analysis with Basic Fundamentals", Vibration Analysis Hardware, Accessed Mar. 2, 2015, 96 pages. <http://www.vibranalysis.co.za/ctc/pdf/pubTechPapers/01-Beginning%20Vibration%20Analysis.pdf>.
"Tachometer", Wikipedia, Accessed Mar. 2, 2015, 4 pages. <http://en.wikipedia.org/wiki/Tachometer>.
Suri Ganeriwala, "Review of Techniques for Bearings & Gearbox Diagnostics", IMAC Conference, Feb. 3, 2010, 37 pages.

* cited by examiner

*Primary Examiner* — Hoai V Ho

(57) ABSTRACT

A sensor sampling system comprises a field unit to receive at least one analysis parameter from a base station and a signal representing a machine parameter monitored by a machine sensor. The field unit analyzes the signal based on the at least one machine parameter to generate a representation of the machine parameter, and wirelessly transmits the representation of the machine parameter for reception by the base station.

23 Claims, 4 Drawing Sheets

SYSTEM AND METHOD FOR MACHINE PARAMETER ANALYSIS IN WIRELESS FIELD UNITS

CROSS-REFERENCE TO RELATED APPLICATION

The present disclosure claims priority to U.S. Patent Application Ser. No. 62/013,215, entitled "System and Method for Machine Parameter Analysis in Wireless Field Units" and filed on Jun. 17, 2014, the entirety of which is incorporated by reference herein.

BACKGROUND

Field of the Disclosure

The present disclosure relates generally to industrial facilities and, more particularly, to monitoring of machine parameters in industrial facilities.

Description of the Related Art

Industrial facilities, such as manufacturing facilities, laboratories, research facilities, refineries, other structures, and the like, often use sensors to monitor machine parameters. For example sensors may be used to measure machine parameters such as vibration, acceleration, velocity, sound, electric field, speed, torque, displacement, and the like. Each sensor produces an analog output voltage, current, or digital representation of the machine parameter being measured. In many cases, a field unit samples the signal output by the sensor and transmits data representing the sampled signal over a wireless network to a base unit. In some instances the sensor may reduce the sampled signal to an overall estimate of the signal or send fixed a priori bands of the signal. However, such estimates are only able to provide limited information, and fixed a priori bands often fail to encompass relevant bands of interest. As such, the sampled signal usually includes an entire waveform or otherwise large amounts of data to represent the signal. Often times, the field units are battery powered and have limited bandwidth for transmitting the signals produced by the sensors monitoring the machine parameters. Consequently, transmission of the data representing the sampled sensor signals often taxes the wireless network and limits the operational time of the field units on a given battery charge, resulting in delays, transmission errors, field unit failures, frequent battery replacement, inefficiencies, greater expense, and safety concerns.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate example implementations of a sensor sampling system implementing field units (e.g. battery-powered field units) that receive analysis parameters from a base station in order to analyze an incoming signal representing one or more machine parameters. Each field unit comprises, or is otherwise communicatively coupled to, a machine sensor, such that the field unit receives the signal representing the machine parameter from the machine sensor. The base station wirelessly transmits analysis parameters to the field unit to facilitate analysis of the signal at the field unit.

The field unit analyzes the signal based on the analysis parameters to produce a representation of the machine parameter monitored by the machine sensor. The analysis parameters allow the field unit to identify relevant data about the machine parameter and generate a representation of the machine parameter that comprises less data than the portion of the signal that is analyzed by the field unit. For example, in at least one embodiment, the field unit analyzes the signal based on an operation speed of the machine to identify frequency bands of interest in a quasi-periodic signal and identifies information related to these bands of interest as the representation of the machine parameter rather than the entire portion of the signal being analyzed. These bands in some cases may comprise the entire spectrum. The field unit then wirelessly transmits the representation of the machine parameter to the base station. This field unit analysis method allows the field unit to avoid transmitting insignificant data, thus transmitting less data overall than conventional methods, requiring less radio transmit time, and extending the battery life of battery-operated field units.

As used herein, the term "machine" refers to a structure or combination of structures subject to environmental changes or mechanical forces, either self-generated or externally applied. Structures with self-generated mechanical forces include, for example boilers, compressors, generators, transformers, industrial robots, rotating bearings, mills, lathes, grinders, saws, welders, ovens, mining equipment, and the like. Structures with externally applied mechanical forces include, for example, bridges and other spans, buildings, cranes, boat hulls, highways, and the like. Moreover, it will be appreciated that some machines may comprise structures subject to both self-generated mechanical forces and externally-applied mechanical forces.

Figure 1:
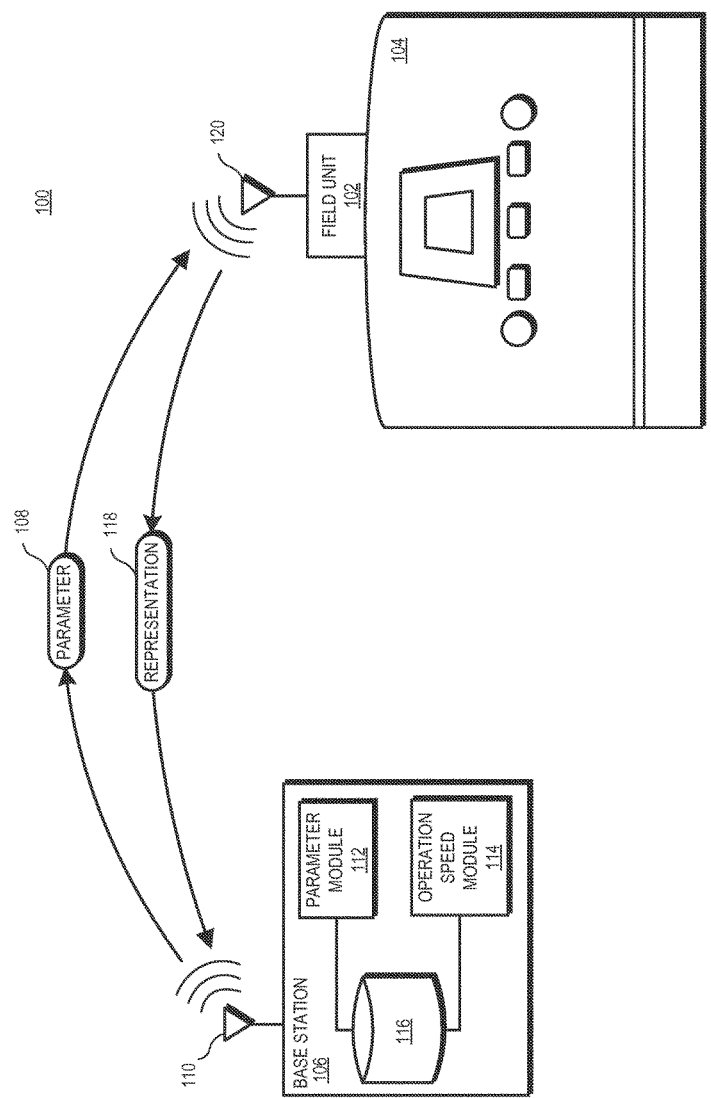
FIG. 1 is a block diagram illustrating a sensor sampling system in accordance with some embodiments.

FIG. 1 illustrates a sensor sampling system 100 for wireless transmission of machine parameter data from a field unit 102 detecting at least one machine parameter of a machine 104 in an industrial facility to a base station 106 in accordance with some embodiments. For example, in some embodiments the field unit 102 may detect any of a variety of machine parameters, including, for example, vibration, pressure, sound, voltage, current, and the like. The field unit 102 may comprise one or more sensors to monitor the machine parameter, or may be communicatively coupled to one or more external sensors monitoring the machine parameter, such that the one or more sensors transmit the signal to the field unit 102.

Conventionally, a field unit receives a signal representing the machine parameter, samples the signal to create a sample waveform, and wirelessly transmits data representing the entirety of the sample waveform to a base station. However, transmitting this amount of data over a wireless network often taxes the wireless network and limits the operational time of battery-powered field units on a given battery charge, resulting in delays, transmission errors, field unit failures, frequent battery replacement, inefficiencies, greater expense, and safety concerns.

In contrast, in the illustrated embodiments, the base station 106 wirelessly transmits at least one analysis parameter 108 to the field unit 102, such that the field unit 102 analyzes the signal based on the analysis parameter 108 to facilitate reducing the amount of data wirelessly transmitted to the base station 106 than required by conventional methods, while still providing meaningful information regarding the machine parameter. In at least one embodiment, the at least one analysis parameter 108 comprises a machine operation speed, a threshold value (i.e., a maximum or minimum value, such that the field unit 102 analyzes whether the machine parameter exceeds the threshold value or is within a range represented by more than one threshold value), an information request (e.g., type or format of data to be received from the field unit 102), an indicator protocol (i.e., rules to indicate when or what the field unit 102 is to transmit to the base station 106, for example, in response to the machine parameter exceeding a threshold value), a combination of these, or the like.

An operation speed may include, for example, the current operation speed of the machine 104, an estimated operation speed of the machine 104, a recent operation speed of the machine 104, an operation speed range for the machine 104 (e.g., the field unit 102 can determine operation speed from the first spectral peak), or the like. Often times, a machine parameter band of interest is related to the operation speed of the machine 104. For example, in the case of a rolling element machine with a machine sensor monitoring vibration, the frequencies of interest often are related to the operation speed of the rolling element. That is, at certain operation speeds of the rolling element, particular frequencies of the vibration signature indicate the health of the machine and point out failing mechanisms. As the rolling element speeds up (higher operation speed), the critical frequencies increase, and as the rolling element slows down (lower operation speed), the critical frequencies decrease. Thus, to know which frequencies are of interest, the operation speed of the rolling element must be known.

The operation speed of the machine 104 may be determined based on one or more settings of the machine 104, a tachometer reading, a calculation or estimation based on reference speeds (e.g., the operation speed of interacting or related machines), or the like. In at least one embodiment, the field unit 102 receives or otherwise determines the operation speed of the machine 104 directly, rather than receiving the operation speed of the machine 104 from the base station 106. In such embodiments, the base station 106 still transmits at least one analysis parameter 108 to facilitate analysis of the signal at the field unit 102 based on the operation speed of the machine 104 and the at least one analysis parameter 108.

In at least one embodiment, the base station 106 comprises a parameter module 112, an operation speed module 114, and a data store 116. The parameter module 112 determines which analysis parameters 108 to transmit to the field unit 102 using, for example, a table, heuristics, a combination of these, or the like. In some embodiments, the operation speed module 114 is responsible for determining what information to transmit to the field unit 102 regarding the operation speed. In at least one embodiment, the operation speed module 114 is in communication with a tachometer or other operation speed sensor. In the illustrated embodiment, the parameter module 112 and the operation speed module 114 are communicatively coupled to the data store 116, such that parameter information and operation speed information may be stored in the data store 116. Similarly, parameter information and operation speed information may be retrieved from the data store 116 to facilitate determining or communicating the at least one parameter 108. The base station 106 wirelessly transmits the at least one parameter 108 (which may include the operation speed of the machine 104) to the field unit 102 via wireless transceiver 110. In some embodiments, the base station 106 comprises a separate wireless receiver and wireless transmitter rather than the depicted wireless transceiver 110.

Rather than sending entire sample waveforms or insignificant values, the field unit 102 analyzes the signal using the at least one analysis parameter 108 to generate a representation 118 of the machine parameter and wirelessly transmits the representation 118 of the machine parameter to the base station 106 via a wireless transceiver 120. The field unit 102 may use any of a variety of techniques or heuristics to analyze the signal based on the at least one parameter 108. In at least one embodiment, the representation 118 of the machine parameter comprises a root mean square (RMS) value within a band, a peak value within a band, variance within a band, a result of an orbit plot, a threshold indicator (e.g., an alarm), a combination of these, or the like. It should be noted that a band can comprise the entire spectrum, or a portion thereof.

The field unit 102 wirelessly transmits the representation 118 of the machine parameter in an effort to reduce the amount of data transmitted and conserve power. For example, a detailed frequency analysis (e.g., FFT) might take 4,096 data points, requiring 8,192 (4,096*2) bytes to transmit. In contrast, if the base station 106 transmits an analysis parameter 108 indicating four values, the field unit 102 analyzes the signal based on the analysis parameter 108 indicating the requested information and the operation speed to generate the representation 118 of the machine parameter. In response to the analysis parameter 108 indicating four values, the representation 118 of the machine parameter includes four data points, requiring 8 (4*2) bytes to transmit, resulting in an approximate 99.9% (ninety-nine point nine percent) reduction in transmitted bytes, and corresponding power savings.

Figure 2:
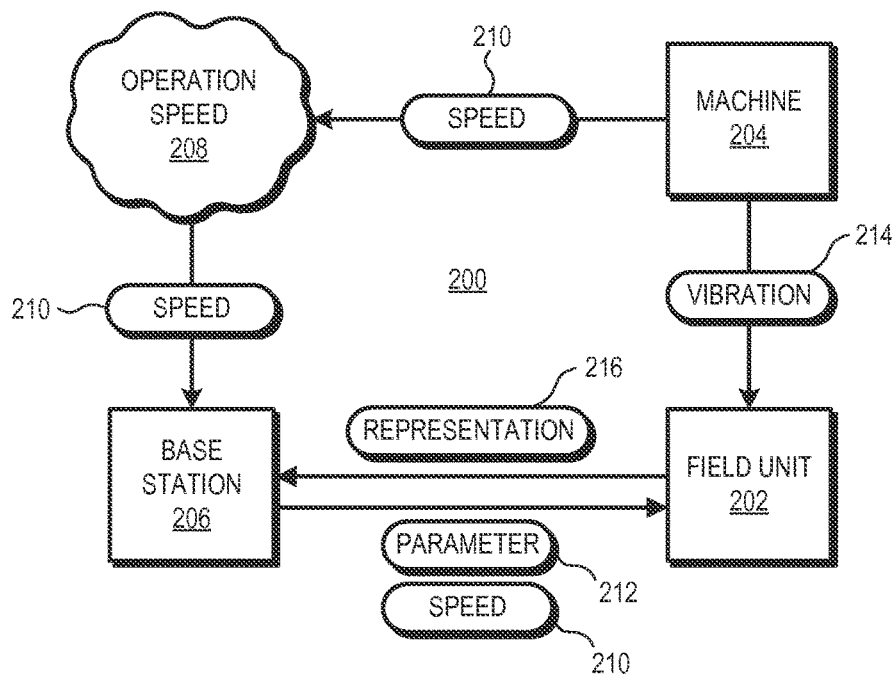
FIG. 2 is a block diagram illustrating another sensor sampling system in accordance with some embodiments.

FIG. 2 illustrates another sensor sampling system 200 in accordance with some embodiments. The sensor sampling system 200 comprises a field unit 202, a machine 204, a base station 206, and an operation speed module 208. In the illustrated embodiment, the operation speed module 208 receives operation speed data 210 from the machine 204 and provides the operation speed data 210 to the base station 206. In some embodiments, the operation speed module 208 may comprise a tachometer or other operation speed detection device disposed at the machine 204 or a reference machine. Alternatively, in some implementations the machine speed might be obtained by making a database query or an OLE for Process Control (OPC) query. In other embodiments, the operation speed module represents hardwired or programmed information related to the operation speed of the machine 204. For example, in some embodiments the machine 204 may run at a constant operation speed, transition through multiple operation speeds at known times, or may be estimated based on other data related to the machine 204. In at least one embodiment, the base station 206 comprises the operation speed module 208. The operation speed data 210 may be transmitted to the operation speed module 208 and the base station 206 via a wired or wireless connection.

In the illustrated embodiment, the base station 206 wirelessly transmits the operation speed data 210 and at least one analysis parameter 212 to the field unit 202 via a wireless transmitter or wireless transceiver. In at least one embodiment, the at least one analysis parameter 212 comprises the machine operation speed data 210, a threshold value (i.e., a maximum or minimum value, such that the field unit 202 analyzes whether the machine parameter exceeds the threshold value or is within a range represented by more than one threshold value), an information request (e.g., type or format of data to be received from the field unit 202), an indicator protocol (i.e., rules to indicate when or what the field unit 202 is to transmit to the base station 206, for example, in response to the machine parameter exceeding a threshold value), a combination of these, or the like. In some embodiments, the base station 206 wirelessly transmits multiple analysis parameters 212 to the field unit 202 concurrently, while in other embodiments, the base station 206 wirelessly transmits at least some of the analysis parameters 212 to the field unit 202 separately.

The field unit 202 receives data representing a machine parameter, for example, vibration data 214 from the machine 204 via a machine sensor. In at least one embodiment, the field unit 202 is communicatively coupled to the machine sensor. In the illustrated embodiment, the field unit 102 comprises the machine sensor that monitors the vibration data 214, for example, an accelerometer. In the illustrated embodiment, the field unit 202 analyzes the vibration data 214 monitored by the machine sensor based on the at least one analysis parameter 212 and the operation speed data 210 received from the base station 206, to generate a representation 216 of the machine parameter. The field unit 202 wirelessly transmits the representation 216 of the machine parameter for receipt by the base station 206 via a wireless transmitter or a wireless transceiver. In at least one embodiment, the representation 216 of the machine parameter comprises a root mean square (RMS) value within a band, a peak value within a band, variance within a band, a result of an orbit plot, a threshold indicator (e.g., an alarm), a combination of these, or the like.

Figure 3:
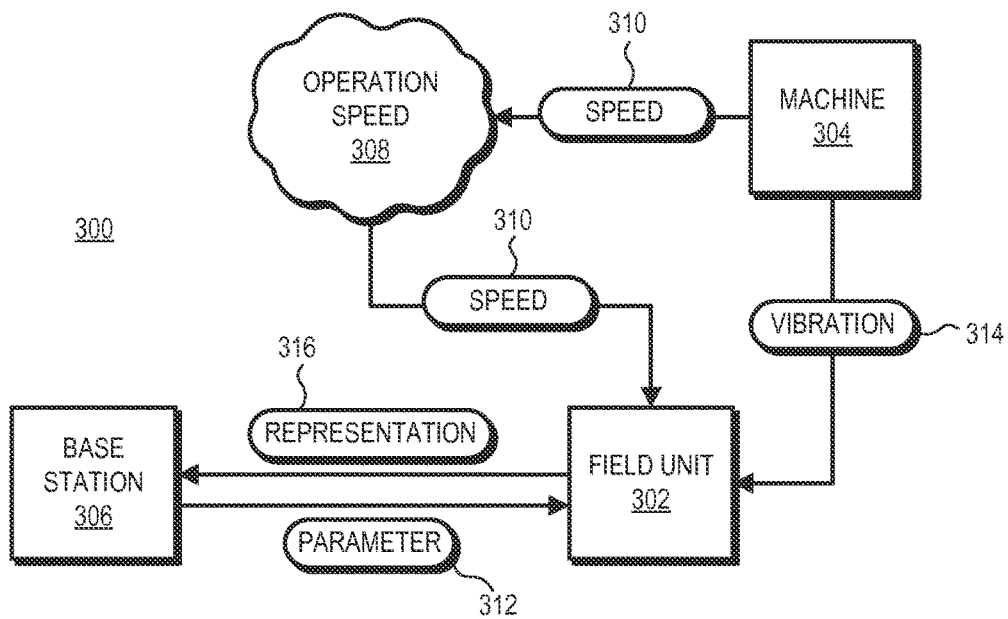
FIG. 3 is a block diagram illustrating yet another sensor sampling system in accordance with some embodiments.

FIG. 3 illustrates another sensor sampling system 300 in accordance with some embodiments. The sensor sampling system 300 comprises a field unit 302, a machine 304, a base station 306, and an operation speed module 308. In the illustrated embodiment, the operation speed module 308 receives operation speed data 310 from the machine 304 and provides the operation speed data 310 directly to the field unit 302. In some embodiments, the operation speed module 308 may comprise a tachometer or other operation speed detection device disposed at the machine 304 or a reference machine. In other embodiments, the operation speed module represents hardwired or programmed information related to the operation speed of the machine 304. For example, in some embodiments the machine 304 may run at a constant operation speed, transition through multiple operation speeds at known times, or may be estimated based on other data related to the machine 304. In at least one embodiment, the field unit 302 comprises the operation speed module 308. The operation speed data 310 may be transmitted to the operation speed module 308 and the field unit 302 via a wired or wireless connection.

In the illustrated embodiment, the base station 306 wirelessly transmits at least one analysis parameter 312 to the field unit 302 via a wireless transmitter or wireless transceiver. In at least one embodiment, the at least one analysis parameter 312 comprises a threshold value (i.e., a maximum or minimum value, such that the field unit 302 analyzes whether the machine parameter exceeds the threshold value or is within a range represented by more than one threshold value), an information request (e.g., type or format of data to be received from the field unit 302), an indicator protocol (i.e., rules to indicate when or what the field unit 302 is to transmit to the base station 306, for example, in response to the machine parameter exceeding a threshold value), a combination of these, or the like. In some embodiments, the base station 306 wirelessly transmits multiple analysis parameters 312 to the field unit 302 concurrently, while in other embodiments, the base station 306 wirelessly transmits at least some of the analysis parameters 312 to the field unit 302 separately.

The field unit 302 receives data representing a machine parameter, for example, vibration data 314, from the machine 304 via a machine sensor. In at least one embodiment, the field unit 302 is communicatively coupled to the machine sensor. In the illustrated embodiment, the field unit 102 comprises the machine sensor that monitors the vibration data 314, for example, an accelerometer. In the illustrated embodiment, the field unit 302 analyzes the vibration data 314 monitored by the machine sensor based on the operation speed data 310 received from the operation speed module 308 and the at least one analysis parameter 312 received from the base station 306, to generate a representation 316 of the machine parameter. The field unit 302 wirelessly transmits the representation 316 of the machine parameter for receipt by the base station 306 via a wireless transmitter or a wireless transceiver. In at least one embodiment, the representation 316 of the machine parameter comprises a root mean square (RMS) value within a band, a peak value within a band, variance within a band, a result of an orbit plot, a threshold indicator (e.g., an alarm), a combination of these, or the like.

Figure 4:
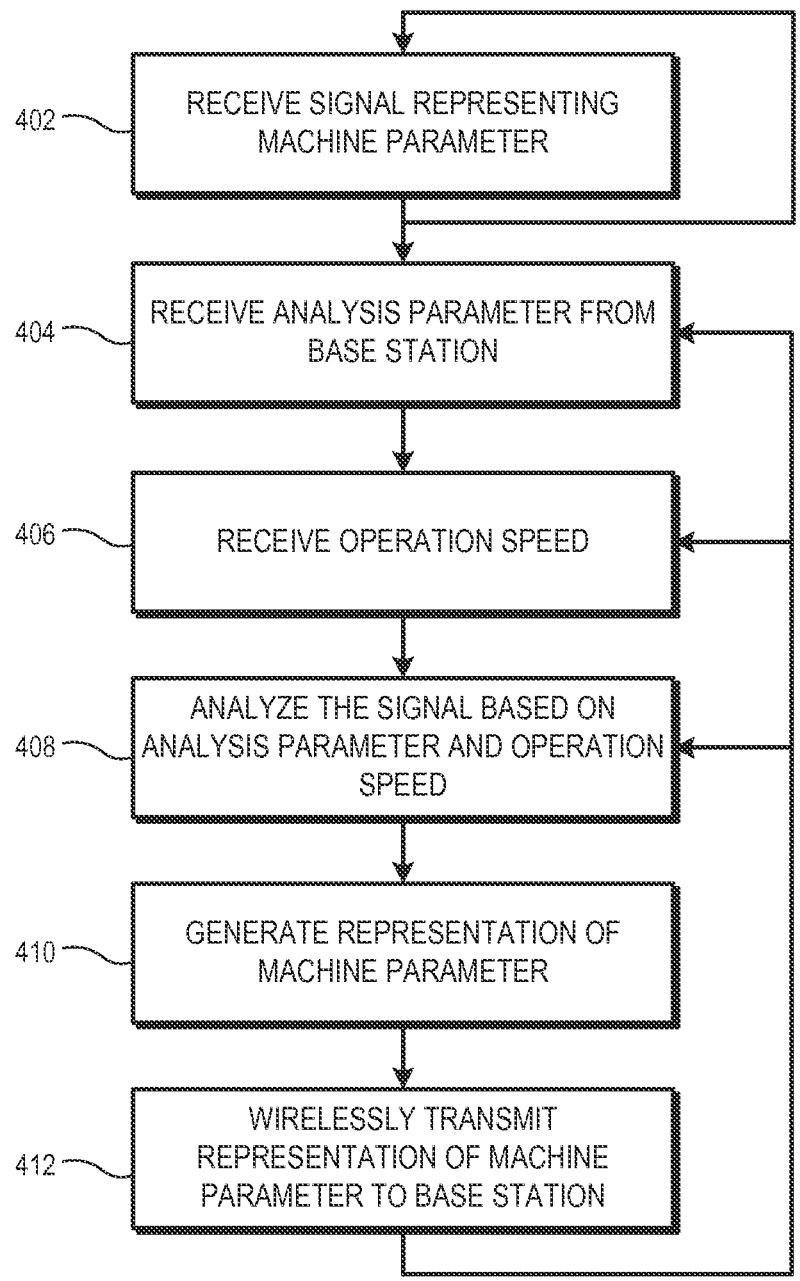
FIG. 4 is a flow diagram illustrating a machine parameter analysis method in accordance with some embodiments.

FIG. 4 illustrates a machine parameter analysis method 400 in accordance with some embodiments. For clarity, the machine parameter analysis method 400 is described with reference to the sensor sampling system 100 of FIG. 1. At block 402, the field unit 102 receives a signal representing the machine parameter monitored by the machine sensor. For example, in at least one embodiment, the field unit 102 receives an analog signal and converts the analog signal of the machine sensor to a digital signal using, for example, an analog-to-digital converter (ADC). In other embodiments, the field unit 102 receives the signal information in digital form. In at least one embodiment, the field unit 102 comprises the machine sensor monitoring the machine parameter. In at least one embodiment, the machine parameter analysis method returns to block 402, such that the field unit 102 receives the signal representing the machine parameter contemporaneously or in parallel with other actions (e.g., related to blocks 404-412).

At block 404, the field unit 102 receives at least one analysis parameter 108 from the base station 106. In at least one embodiment, the at least one analysis parameter 108 comprises a machine operation speed, a threshold value (i.e., a maximum or minimum value, such that the field unit 102 analyzes whether the machine parameter exceeds the threshold value or is within a range represented by more than one threshold value), an information request (e.g., type or format of data to be received from the field unit 102), an indicator protocol (i.e., rules to indicate when or what the field unit 102 is to transmit to the base station 106, for example, in response to the machine parameter exceeding a threshold value), a combination of these, or the like.

The base station 106 wirelessly transmits the at least one analysis parameter 108 to the field unit 102 via a wireless transceiver or transducer. The base station 106 may select the at least one analysis parameter 108 based on hardwired logic, programming, user selection, sensor information, heuristics, a combination of these, or the like. In some embodiments, the base station 106 updates the at least one analysis parameter 108 at predetermined intervals (e.g., once a day, every hour, etc.), in response to new or updated information (e.g., a tachometer indicates a new machine speed), based on an indication from the field unit 102 (e.g., a request for an updated analysis parameter 108, an indication that the field unit 102 is active, etc.), in response to reception of the representation 118 of the machine parameter from the field unit 102, arbitrarily, a combination of these, or the like. Further, the base station 106 may transmit multiple analysis parameters 108 in a single transmission, in parallel transmissions, in subsequent transmissions, or a combination of these.

At block 406, the field unit 102 receives the operation speed. For example, in at least one embodiment, the field unit 102 receives the operation speed of the machine 104 from the base station 106 as one of the analysis parameters 108 or otherwise. The operation speed of the machine 104 may be determined based on one or more settings of the machine 104, a tachometer reading, a calculation or estimation based on reference speeds (e.g., the operation speed of interacting or related machines), query to a database or an OPC query, or the like. In at least one embodiment, the field unit 102 receives or otherwise determines the operation speed of the machine 104 directly, rather than receiving the operation speed of the machine 104 from the base station 106. The operation speed may include, for example, the current operation speed of the machine 104, an estimated operation speed of the machine 104, a recent operation speed of the machine 104, an operation speed range for the machine 104 (e.g., the field unit 102 can determine operation speed from spectral or temporal analysis), or the like. The field unit 102 receives the wireless transmissions including the at least one analysis parameter 108 and the operation speed via a wireless receiver or wireless transceiver. However, in some instances, the operation speed is not needed for the parameter set, in which case this step may be omitted.

At block 408, the field unit 102 analyzes the machine parameter signal based on the at least one analysis parameter 108 received from the base station 106 and the operation speed of the machine 104. Often times, a machine parameter band of interest is related to the operation speed of the machine 104. For example, in the case of a rolling element machine with a machine sensor monitoring vibration, the frequencies of interest often are related to the operation speed of the rolling element. That is, at certain operation speeds of the rolling element, particular frequencies of the vibration signature indicate the health of the machine and point out failing mechanisms. As the rolling element speeds up (higher operation speed), the critical frequencies increase, and as the rolling element slows down (lower operation speed), the critical frequencies decrease. Thus, to know which frequencies are of interest, the operation speed of the rolling element must be known.

In addition to identifying the frequencies of interest based on the operation speed of the machine 104, the field unit 102 analyzes the signal (or the band of interest) based on the analysis parameters 108. For example, in one embodiment, the analysis parameters 108 include status indicators for different threshold values, and the field unit 102 analyzes the signal to determine if the threshold values are exceeded. If one or more of the threshold values is exceeded, the field unit 102 may identify the relevant status indicator based on the analysis parameters 108 received from the base station 106. The field unit 102 may use any of a variety of techniques to analyze the signal, for example, fast Fourier transform (FFT), discrete Fourier transform (DFT), order-based analysis, or the like.

At block 410, the field unit 102 generates the representation 118 of the machine parameter based on the analysis of the machine parameter signal performed at block 408. In at least one embodiment, the representation 118 of the machine parameter comprises a root mean square (RMS) value within a band, a peak value within a band, variance within a band, a result of an orbit plot, a threshold indicator (e.g., an alarm), a combination of these, or the like. In some embodiments, the at least one analysis parameter 108 indicates the type of representation 118 of the machine parameter that the field unit 102 is to generate. For example, analysis parameters 108 may indicate that the field unit 102 is to generate information related to an orbit plot as a representation 118 of the machine parameter. In such a case, the field unit 102 analyzes two waveforms to generate the data representing the orbit plot.

At block 412, the field unit 102 wirelessly transmits the representation 118 of the machine parameter via a wireless transmitter or wireless transceiver for reception by the base station 106. In the example of the analysis parameter 108 indicating information related to an orbit plot, the field unit 102 wirelessly transmits the data related to the orbit plot (as the representation 118 of the machine parameter) for receipt by the base station 106. Instead of transmitting the two waveforms needed to create the orbit plot, the field unit 102 saves bandwidth by transmitting less data to represent the same orbit plot. For example, in at least one embodiment, the field unit 102 only transmits an indicator to indicate whether the orbit plot is normal. In another embodiment, the field unit 102 only transmits a notification to notify the base station 106 when the orbit plot is not normal. The analysis parameters 108 and representation 118 of the machine parameter may comprise any of a number of variations in different embodiments. The representation 118 of the machine parameter may be transmitted in a single transmission, parallel transmissions, or subsequent transmissions.

Following the wireless transmission of the representation 118 of the machine parameter at block 412, the machine parameter analysis method 400 returns to block 404, block 406, or block 408. In at least one embodiment, the machine parameter analysis method 400 returns to block 408, such that the field unit 102 analyzes a new portion of the signal based on the same analysis parameter 108 and operation speed. In another embodiment, the operation speed of the machine 104 may be updated (e.g., in response to a change in the operation speed of the machine 104), such that the machine parameter analysis method 400 returns to block 406, and the field unit 102 receives a new operation speed, then analyzes the signal based on the same analysis parameters 108 and the new operation speed.

In yet another embodiment, the analysis parameter may be updated, such that the machine parameter analysis method 400 returns to block 404 and the field unit 102 receives at least one new analysis parameter. In some examples of this embodiment, the machine parameter analysis method 400 may skip block 406 and proceed directly to block 408 in the case that the same operation speed is to be used. At block 408 the field unit 102 analyzes the signal based on the new analysis parameter and a new operation speed (or the same operation speed in the case that block 406 is skipped). For example, the machine 104 may fail over an extended period of time (e.g., hours, days, weeks, months, etc.). Based on the representation 118 of the machine parameter (or other data), the base station 106 (or a user) may predict when the machine 104 will fail, and update or otherwise set parameters correspondingly. In such a case, the at least one analysis parameter 108 may be updated or otherwise changed, such that the machine parameter analysis method 400 would return to block 404. In at least one embodiment, the machine parameter analysis method 400 returns to each of blocks 404, 406, 408 under different scenarios, which may be determined by heuristics or other mechanisms.

By using this machine parameter analysis method 400, the base station 106 is able to receive relevant information related to the machine parameter (and machine health) being monitored, while reducing the amount of data transmitted over the wireless network to represent the machine parameter. Thus, the machine parameter analysis method 400 reduces the transmit time and power needed to wirelessly transmit machine parameter data, which permits the field unit 102 to operate longer on a given battery charge and consume less radio transmit time.

Figure 5:
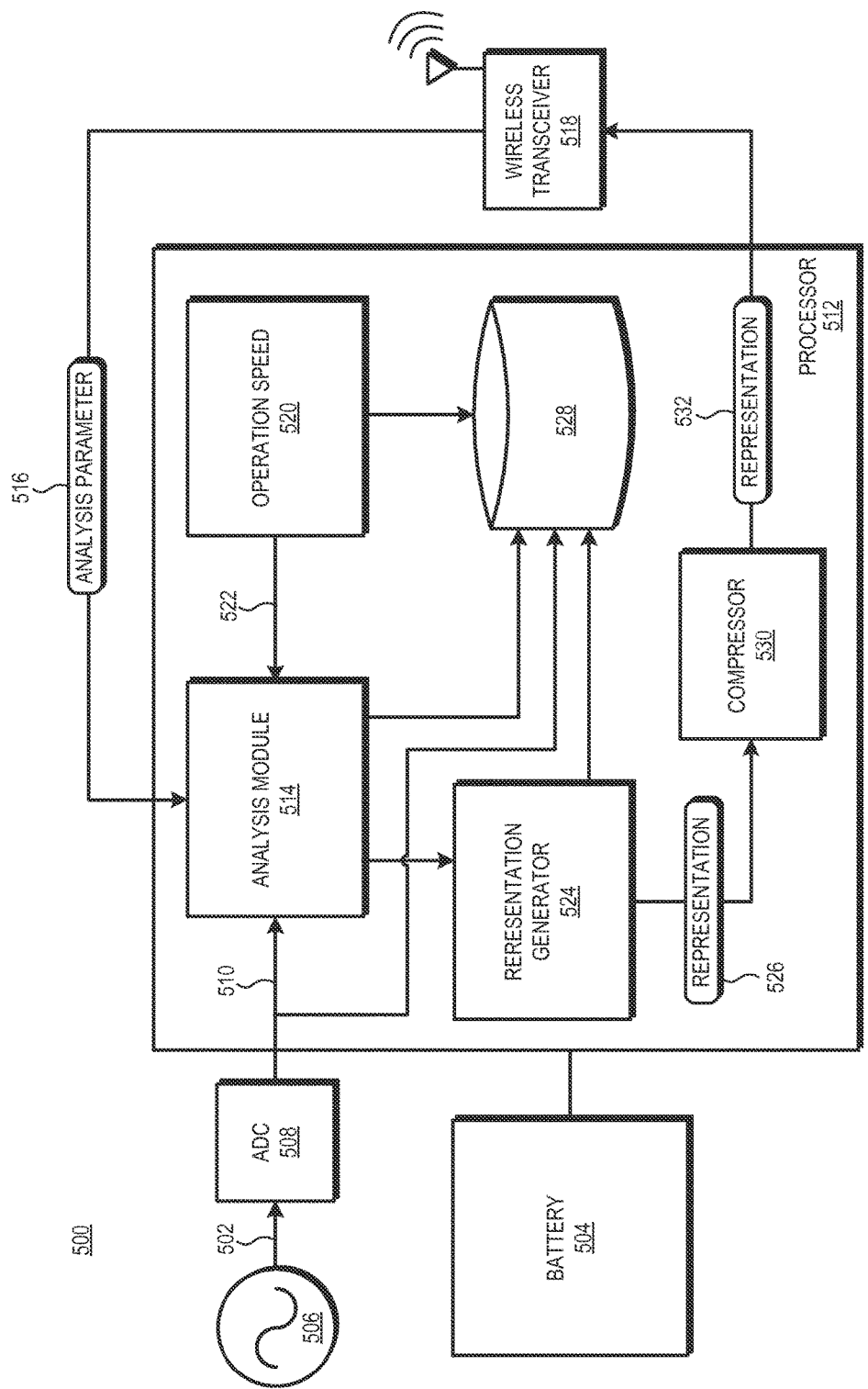
FIG. 5 is a block diagram illustrating a battery-powered field unit as used in the sensor sampling system of FIG. 3 in accordance with some embodiments.

FIG. 5 illustrates a field unit 500 similar to the field unit 302 as used in the sensor sampling system 300 of FIG. 3 to sample an analog signal 502 in accordance with some embodiments. In the illustrated embodiment, the field unit 500 comprises at least one battery 504 to power the field unit 500; however, in other embodiments, the field unit 500 may be powered by any power source. The field unit 500 further comprises a machine sensor 506 to monitor at least one machine parameter of the machine 304 and produce an analog output voltage or current, representing the analog signal 502. The machine sensor 506 may comprise, for example, an accelerometer, a displacement probe, a proximity probe, a sound probe, a velocity sensor, a voltage sensor, a current sensor, and the like. While the illustrated embodiment depicts the field unit 500 as comprising the machine sensor 506, in other embodiments the machine sensor 506 may be remote relative to the field unit 500.

The machine sensor 506 provides the analog signal 502 to an analog-to-digital converter (ADC) 508 for conversion to a digital signal 510. Further, in some embodiments, the field unit 500 processes the analog output from the machine sensor 506 using any of a variety of processes, for example, low-pass filtering, high-pass filtering, band-pass filtering, gain adjustment, non-linear adjustments, noise mitigation, zero crossing detection, level detection, distortion correction, limiting, rectification, and other types of linear or non-linear processes.

The ADC 508 sends the digital signal 510 to a processor 512, for example, a Field Programmable Gate Array (FPGA) or a Digital Signal Processor (DSP). An analysis module 514 receives the digital signal 510 for analysis. The processor 512 further receives at least one analysis parameter 516 via a wireless transceiver 518 (or wireless receiver). In at least one embodiment, the at least one analysis parameter 516 is transmitted for receipt by the field unit 500 by the base station 306. In at least one embodiment, the at least one analysis parameter 516 comprises a machine operation speed, a threshold value (i.e., a maximum or minimum value, such that the field unit 500 analyzes whether the machine parameter exceeds the threshold value or is within a range represented by more than one threshold value), an information request (e.g., type or format of data to be received from the field unit 500), an indicator protocol (i.e., rules to indicate when or what the field unit 500 is to transmit to the base station 306, for example, in response to the machine parameter exceeding a threshold value), a combination of these, or the like.

An operation speed module 520 provides information related to the operation speed 522 of the machine 304 to the analysis module 514. The operation speed 522 may include, for example, the current operation speed of the machine 304, an estimated operation speed of the machine 304, a recent operation speed of the machine 304, or the like. The operation speed 522 of the machine 304 may be determined based on one or more settings of the machine 304, a tachometer reading, a calculation or estimation based on reference speeds (e.g., the operation speed of interacting or related machines), an operation speed range for the machine 304 (e.g., the field unit 500 can determine operation speed from spectral or temporal analysis), or the like. In at least one embodiment, the operation speed module 520 receives the operation speed 522 information from the base station 306 via the wireless transceiver 518. In another embodiment, the operation speed module 520 receives or otherwise determines the operation speed 522 of the machine 304 directly, rather than receiving the operation speed 522 of the machine 304 from the base station 306.

The analysis module 514 analyzes the digital signal 510 based on the at least one analysis parameter 516 and the operation speed 522 and provides the results to a representation generator 524. That is, the analysis module 514 identifies relevant data based on the at least one analysis parameter 516 and the operation speed 522. For example, the analysis module 514 might identify peak values in a frequency band of interest, determine whether threshold values are exceeded, produce an orbit plot, or the like.

The representation generator 524 generates a representation 526 of the machine parameter monitored by the sensor 506. In at least one embodiment, the type or form of the representation 526 is determined based on one or more of the analysis parameters 516. In at least one embodiment, the representation 526 of the machine parameter comprises a root mean square (RMS) value within a band, a peak value within a band, variance within a band, a result of an orbit plot, a threshold indicator (e.g., an alarm), a combination of these, or the like. Generally, the representation generator 524 generates the representation 526 of the machine parameter such that the representation 526 of the machine parameter comprises less data than the digital signal or relevant waveforms as a whole.

In the illustrated embodiment, the representation generator 524 sends the representation 526 of the machine parameter to a data store 528 to maintain the representation 526 of the machine parameter until needed by another component of the field unit 500, until it is transmitted by the wireless transceiver 518, or otherwise. The data store 528 of various embodiments may also maintain data related to the digital signal 510, the operation speed 522 of the machine 304, the analysis results produced by the analysis module 514, the analysis parameters 516, information received by the wireless transceiver 518, or other information used or produced by the processor 512. Further, while the data store 528 is depicted at the processor 512, other embodiments may comprise an off-chip data store, or a combination of on-chip and off-chip data stores.

In the illustrated embodiment, the representation 526 of the machine parameter is compressed by a compressor 530 to generate a compressed representation 532 that is of a reduced size relative to the representation 526. However, other embodiments may not compress the representation 526. The processor 512 sends the representation 526 of the machine parameter (or the compressed representation 532) to the wireless transceiver 518 (or a wireless transmitter) to wirelessly transmit the representation 526 of the machine parameter (or the compressed representation 532) for receipt by the base station 306. Given the reduced size of the representation 526 of the machine parameter (or the compressed representation 532) relative to the relevant waveform or signal itself, the transmit time and power needed to wirelessly transmit this data is also decreased, which extends the life of the battery 504, and permits the field unit 500 to operate longer on a given battery charge, while still providing the base station 306 with relevant data related to the machine parameter.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
a field unit, the field unit to:
receive, from a base station, at least one analysis parameter designating at least one threshold value against which a machine parameter monitored by a machine sensor is compared;
receive, at a wireless transceiver of the field unit, a signal representing the machine parameter;
analyze, at a processor of the field unit, the signal based on the at least one analysis parameter to generate a representation of the machine parameter; and
wirelessly transmit, from the wireless transceiver of the field unit, the representation of the machine parameter for reception by the base station.

2. The system of claim 1, further comprising the base station.

3. The system of claim 1, further comprising the machine sensor.

4. The system of claim 1, wherein the machine parameter comprises vibration.

5. The system of claim 1, further comprising:
a tachometer; and
wherein the field unit is further to:
receive a rotational speed reading from the tachometer; and
analyze the signal based on the rotational speed reading to generate the representation of the machine parameter.

6. The system of claim 1, wherein the at least one analysis parameter comprises at least one of: a machine operation speed, a threshold value, a format for the representation of the machine parameter, and an indicator protocol.

7. The system of claim 1, wherein the representation of the machine parameter comprises at least one of: a root mean square (RMS) value within a band, a peak value within a band, variance within a band, a result of an orbit plot, and a threshold indicator.

8. The system of claim 7, wherein the threshold indicator comprises an alarm.

9. The system of claim 1, wherein the field unit further comprises at least one battery.

10. A method comprising:
wirelessly transmitting, from a wireless transceiver of a base station for reception by a field unit, at least one analysis parameter designating at least one threshold value against which a machine parameter monitored by a machine sensor at the field unit is compared; and
receiving, at the wireless transceiver of the base station, a representation of the machine parameter based on the at least one analysis parameter and a signal representing the machine parameter.

11. The method of claim 10, wherein the machine parameter comprises vibration.

12. The method of claim 10, wherein the at least one analysis parameter comprises at least one of: a machine operation speed, a threshold value, a format for the representation of the machine parameter, and an indicator protocol.

13. The method of claim 10, wherein the representation of the machine parameter comprises at least one of: a root mean square (RMS) value within a band, a peak value within a band, variance within a band, a result of an orbit plot, and a threshold indicator.

14. The method of claim 10, wherein:
the machine parameter comprises machine operation speed; and
the field unit obtains the machine operation speed through a database query or an OLE for Process Control (OPC) query.

15. The method of claim 10, further comprising:
receiving, at the base station, a rotational speed reading from a tachometer; and
wirelessly transmitting, from the base station, the rotational speed reading for reception by the field unit.

16. A method comprising:
receiving, at a wireless transceiver of a field unit, at least one analysis parameter from a base station that designates at least one threshold value against which a machine parameter monitored by a machine sensor is compared;
receiving, at the field unit, a signal representing the machine parameter;
analyzing, at a processor of the field unit, the signal based on the at least one analysis parameter to generate a representation of the machine parameter; and wirelessly transmitting, from the wireless transceiver of the field unit, the representation of the machine parameter for reception by the base station.

17. The method of claim 16, wherein the machine parameter comprises vibration.

18. The method of claim 16, further comprising:
receiving, at the field unit, a rotational speed reading from a tachometer.

19. The method of claim 16, wherein the at least one analysis parameter comprises at least one of: a machine operation speed, a threshold value, a format for the representation of the machine parameter, and an indicator protocol.

20. The method of claim 16, wherein the representation of the machine parameter comprises at least one of: a root mean square (RMS) value within a band, a peak value within a band, variance within a band, a result of an orbit plot and a threshold indicator.

21. The method of claim 20, wherein the threshold indicator comprises an alarm.

22. The method of claim 16, wherein analyzing the signal comprises analyzing an orbit plot of the signal to generate the representation of the machine parameter.

23. The method of claim 16, wherein the field unit is battery-operated.

* * * * *